(12) United States Patent
Waters et al.

(10) Patent No.: US 8,059,764 B2
(45) Date of Patent: Nov. 15, 2011

(54) SYSTEMS AND METHODS FOR LOW-COMPLEXITY MAX-LOG MIMO DETECTION

(75) Inventors: Deric W. Waters, Dallas, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 847 days.

(21) Appl. No.: 12/062,347

(22) Filed: Apr. 3, 2008

(65) Prior Publication Data

US 2008/0260075 A1 Oct. 23, 2008

Related U.S. Application Data

(60) Provisional application No. 60/912,312, filed on Apr. 17, 2007.

(51) Int. Cl.
*H04L 27/06* (2006.01)
(52) U.S. Cl. .......................... 375/341; 375/347
(58) Field of Classification Search .......... 375/259–260, 375/262, 267, 299, 316, 295, 347, 341
See application file for complete search history.

(56) References Cited

U.S. PATENT DOCUMENTS

| | | | | |
|---|---|---|---|---|
| 7,551,506 B2 * | 6/2009 | Mori et al. | | 365/225.7 |
| 7,616,699 B2 * | 11/2009 | Niu et al. | | 375/267 |
| 7,720,169 B2 * | 5/2010 | Reuven et al. | | 375/267 |
| 7,734,990 B2 * | 6/2010 | Maru | | 714/780 |
| 7,746,951 B2 * | 6/2010 | Hwang et al. | | 375/267 |
| 2005/0135498 A1 * | 6/2005 | Yee | | 375/267 |
| 2005/0201478 A1 * | 9/2005 | Claussen et al. | | 375/261 |
| 2006/0245348 A1 * | 11/2006 | Ojard | | 370/208 |
| 2007/0116143 A1 * | 5/2007 | Bjerke et al. | | 375/262 |
| 2008/0225974 A1 * | 9/2008 | Prasad et al. | | 375/262 |

FOREIGN PATENT DOCUMENTS

| | | |
|---|---|---|
| EP | 1578075 A1 | 9/2005 |
| KR | 200200333372 A | 5/2002 |
| WO | 02054645 A2 | 7/2002 |
| WO | 03049397 A2 | 6/2003 |

OTHER PUBLICATIONS

Hochwald, B. M., et al., "Achieving Near-Capacity on a Multiple-Antenna Channel"; IEEE Transcripts on Communications.; Mar. 2003, pp. 389-399, vol. 51, No. 3.
IEEE Std. 802.11a-1999, "Part 11: Wireless LAN Medium Access Control (MAC) and Physical Layer (PHY) Specifications," "High-Speed Physical Layer in The 5 GHz Band," 1999, 83 pgs.

* cited by examiner

*Primary Examiner* — Jean B Corrielus
(74) *Attorney, Agent, or Firm* — Steven A. Shaw; W. James Brady; Frederick J. Telecky, Jr.

(57) ABSTRACT

Embodiments provide novel systems and methods for multiple-input multiple-output (MIMO) Max-Log detection. These systems and methods enable near-optimal performance with low complexity for a two-input two-output channel. Some embodiments comprise using a Max-Log detector to compute a set of log-likelihood ratio (LLR) values for a channel input by minimizing cost function while computing only one instance of the cost function for each value of each bit in a symbol. Other embodiments comprise using a Max-Log detector to compute a set of log-likelihood ratio (LLR) values for a channel input by computing all instances of a cost function for each value of each bit in a symbol and selecting the minimum cost from all computed instances of the cost function for each value of each bit.

9 Claims, 2 Drawing Sheets

SYSTEMS AND METHODS FOR LOW-COMPLEXITY MAX-LOG MIMO DETECTION

CROSS-REFERENCE TO RELATED APPLICATIONS

The present application claims priority to U.S. provisional patent application Ser. No. 60/912,312, filed Apr. 17, 2007 and entitled "Low-Complexity Max-Log MIMO Detector", hereby incorporated herein by reference.

BACKGROUND

As consumer demand for high data rate applications, such as streaming video, expands, technology providers are forced to adopt new technologies to provide the necessary bandwidth. Multiple-Input Multiple-Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver simultaneously fading decreases exponentially. As might be expected, however, there is a price associated with realization of these benefits. Recovery of transmitted information in a MIMO system becomes increasingly complex with the addition of transmit antennas. This becomes particularly true in MIMO orthogonal frequency-division multiplexing (OFDM) systems. Such systems employ a digital multi-carrier modulation scheme using numerous orthogonal sub-carriers.

Many multiple-input multiple-output (MIMO) detection algorithms have been previously proposed in the literature. The optimal algorithm is conceptually simple, but is often impractical due to the fact that its complexity increases exponentially with the number of channel inputs and alphabet size. As a result, many algorithms have been proposed to solve the problem with less complexity, with the unfortunate effect of also significantly sacrificing performance.

Many MIMO detectors have been proposed and implemented as exclusively hard detectors that only give the final estimate of the channel input. Most notable is the sphere decoding detector because it can achieve Max-Log performance in an uncoded system with much less complexity on average. A summary of many MIMO detectors may be found in D. W. Waters, "Signal Detection Strategies and Algorithms for multiple-Input Multiple-Output Channels", Georgia Institute of Technology, PhD dissertation, December 2005, including many variations of the sphere detector that minimize complexity without sacrificing performance. At least one list-sphere detector computes the log-likelihood ratio (LLR) for a channel input. Unfortunately, implementing a list-sphere detector is still quite complex, requiring significant processing resources.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which.

NOTATION AND NOMENCLATURE

Figure 1:
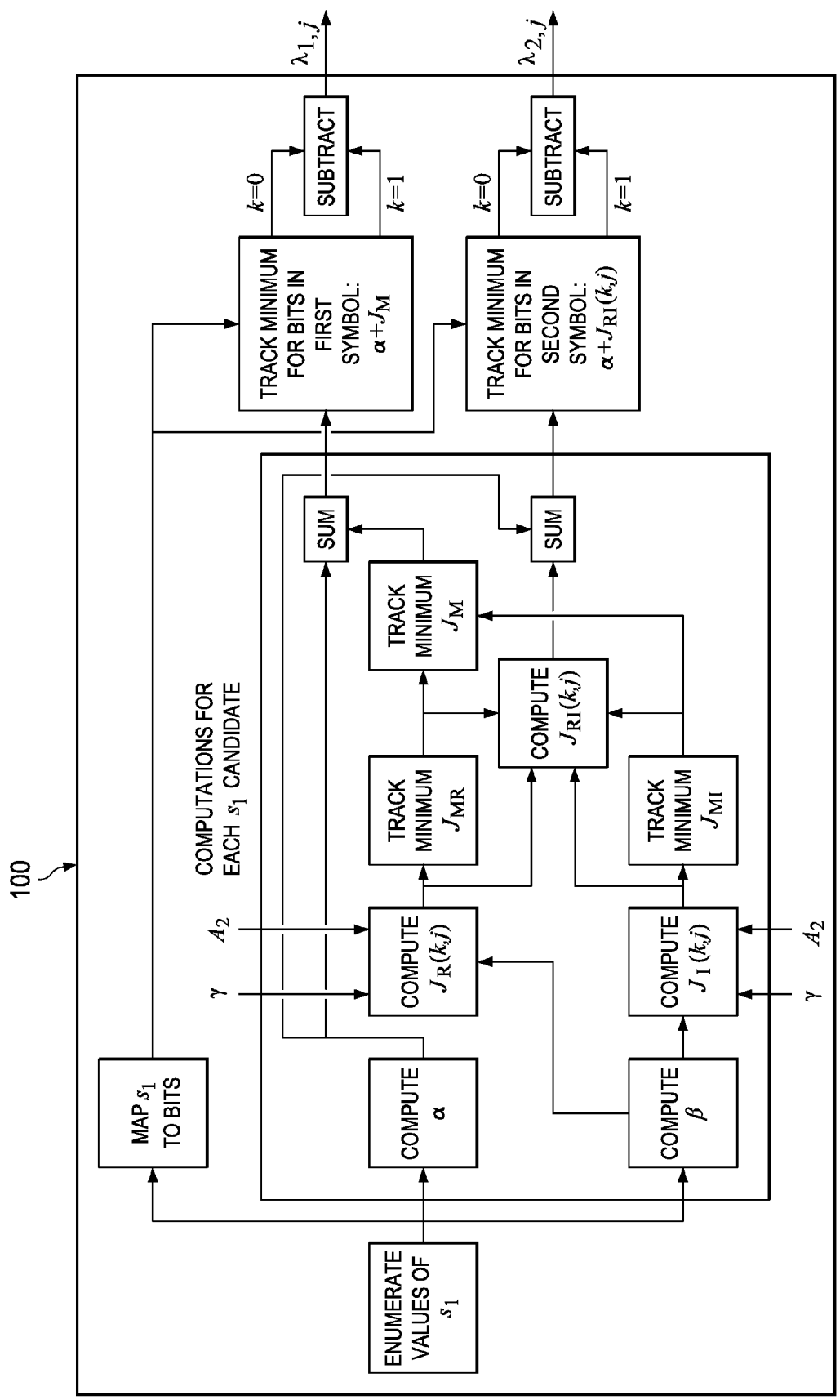
FIG. 1 illustrates a block diagram of an example of a Max-Log detector, according to embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments enable improved multiple-input multiple-output (MIMO) detection by providing improved Max-Log detection with low complexity. Embodiments provide novel systems and methods for multiple-input multiple-output (MIMO) Max-Log detection. These systems and methods enable near-optimal performance with low complexity for a two-input two-output channel. The only performance degradation in some embodiments is due to the Max-Log approximation, which can be compensated for by instead using, for example, a Jacobian logarithm expansion. One specific advantage of embodiments is that they do not require a QR decomposition. In fact, embodiments can be applied to a wide variety of MIMO channels, including MIMO channels created by the special precoding used in the WiMedia Alliance physical layer for the ultra wideband (UWB) system.

Although embodiments will be described for the sake of simplicity with respect to wireless communication systems, it should be appreciated that embodiments are not so limited, and can be employed in a variety of communication systems.

To better understand embodiments of this disclosure, it should be appreciated that the MIMO detection problem— namely, to recover the channel inputs given the channel outputs when there are multiple inputs and outputs—can be described using a narrowband channel model written as:

$$r = Hs + w, \quad (1)$$

where H is an M×N matrix, $s=[s_1 \ s_2 \ \ldots \ s_N]^T$ is an N dimensional vector of symbols that may be drawn from different alphabets, and w is additive noise. The constellation for the i-th symbol is defined as $s_i \in A_i$. For the sake of discussion, $A_i$ will be further segmented into the sets of $A_{i,R}$ and $A_{i,I}$. The set $A_{i,R}$ is the set of unique real elements in $A_i$, while $A_{i,I}$ is the set of unique imaginary elements in $A_i$. For example, if $A_i$ is a $2^{2n}$-QAM constellation, then $A_{i,R}$ and $A_{i,I}$ would each be a $2^n$-PAM constellation. QAM is the acronym for quadrature-amplitude modulation, and PAM is the acronym for pulse-amplitude modulation; for example, if n=2 then $A_i$ is a 16-QAM constellation, and $A_{i,R}$ and $A_{i,I}$ are each 4-PAM constellations. Similarly, it should be seen that other common alphabets 4-QAM, 16-QAM, 64-QAM, and 256-QAM correspond to n=1, 2, 3, and 4, respectively. Another common alphabet is binary phase shift keying (BPSK) where $A_{i,R}$ contains only two values and the imaginary portion of the symbol is not used so that $A_{i,I}$ is an empty set. Embodiments can also be readily extended to other constellations in light of the teachings of the present disclosure.

The set that contains all the elements of any one-dimensional constellation A whose j-th bit have the value k is denoted as A(k, j). For example, $A_i(k, j)$ is the set of all valid values of $s_i$ whose j-th bit have the value k. Similarly, $A_{i,R}(k, j)$ is the set of all valid values of the real part of $s_i$ whose j-th bit have the value k. The set containing all valid values of the channel input vector is denoted as S, this means $s \in S$. The set of all possible channel input vectors that have the value k in the j-th bit of the i-th element is denoted as $s^{(k)} \in S(k,i,j)$.

The optimal output of a MIMO detector is the log-likelihood ratio (LLR) of each bit transmitted in the vector s. Such LLR value indicates the probability that a given bit was transmitted as a one or zero. One way to define the LLR of the j-th bit of the i-th symbol is:

$$\lambda_{i,j} = \ln \frac{Pr[b_{i,j} = 1 \mid r]}{Pr[b_{i,j} = 0 \mid r]}, \quad (2)$$

where $b_{i,j}$ is the j-th bit value as mapped from the channel input $s_i$. A common way to rewrite this LLR definition assumes independence among the input bits, $\{b_{i,j}\}$, and can be written as:

$$\lambda_{i,j} = \ln \frac{Pr[r \mid b_{i,j} = 1]}{Pr[r \mid b_{i,j} = 0]} \quad (3)$$

$$= \ln \frac{\sum_{\hat{s} \in S(1,i,j)} Pr[r \mid \hat{s} = s]}{\sum_{\hat{s} \in S(0,i,j)} Pr[r \mid \hat{s} = s]}$$

$$= \ln \sum_{\hat{s} \in S(1,i,j)} Pr[r \mid \hat{s} = s] - \ln \sum_{\hat{s} \in S(0,i,j)} Pr[r \mid \hat{s} = s]$$

where ln(x) denotes the natural logarithm of x. When the noise is Gaussian, the conditional probability $Pr[r \mid \hat{s}=s]$ can be expressed as follows:

$$Pr[r \mid \hat{s} = s] = \frac{1}{(2\pi\sigma^2)^M} \exp[-(r - H\hat{s}) * (E[ww^*])^{-1}(r - H\hat{s})]. \quad (4)$$

where E[●] denotes the expectation function. As a result, it should be appreciated that the Max-Log approximation of the optimal MIMO detector output for the I-th bit of the i-th symbol is described by a single equation:

$$\lambda_{i,j} = (r - Hs^{(o)}) * (E[ww^*])^{-1} (r - Hs^{(o)}) - (r - Hs^{(1)}) * (E[ww^*])^{-1} (r - Hs^{(1)}), \quad (5)$$

where $s^{(k)}$ minimizes the cost $(r-Hs^{(k)})*(E[ww^*])^{-1}(r-Hs^{(k)})$ under the constraint that $s^{(k)} \in S(k,i,j)$. Each embodiment implementing equation (5) is referred to as implementing a Max-Log detector because it uses the approximation that $\ln(e^A+e^B) \approx \max(A,B)$. When the noise is white, $E[ww^*]=I\sigma^2$, the Max-Log detector output simplifies to:

$$\lambda_{i,j} = (\|r - Hs^{(o)}\|^2 - \|r - Hs^{(1)}\|^2)/\sigma^2. \quad (6)$$

It should be understood that this is only one example of how an LLR may be computed, and should not be used as a limitation on the embodiments disclosed or invention claimed. For example, it will be readily appreciated by those skilled in the art after considering the teachings of the present disclosure that a Jacobian logarithm can be used as an alternative to the Max-Log approximation by using $\ln(e^A+e^B) \approx \max(A, B)+\ln(1+e^{-|A-B|})$ in a recursive manner. For convenience, the term Max-Log detector encompasses all such embodiments.

A modified Max-Log detector can be particularly defined in order to reduce complexity. The LLR equations in (5) and (6) do not change, but the set to which $s^{(k)}$ belongs is further constrained. Namely, $\lambda_{i,j}$ is computed according to equations (5) or (6) where $s^{(k)}$ minimizes the cost $(r-Hs^{(k)})*(E[ww^*])^{-1}(r-Hs^{(k)})$ under the constraint that $s^{(k)} \in \tilde{S}(k,i,j)$. The set $\tilde{S}$ is a subset of S so that the process of computing $\lambda_{i,j}$ requires less computational complexity. In some embodiments, the set $\tilde{S}$ is defined such that not all possible values of $s_1$ are included. Instead, only the values of $s_i$ belonging to $\tilde{A}_i$ are included in the set $\tilde{S}$, where $\tilde{A}_i$ is a subset of $A_i$. In the following, the discussion assumes $\tilde{S}=S$, but embodiments also apply to the case where $\tilde{S}$ is further constrained. It should be appreciated that such embodiments are also referred to using the term Max-Log detector at least because they rely on the approximation $\ln(e^A+e^B) \approx \max(A,B)$.

Embodiments of Max-Log implementation can be adapted to any bit-to-symbol mapping that maps the real and imaginary parts of at least one of the channel inputs to different bits. In other words, $0.5 \cdot \log_2 |A_i|$ are mapped onto $s_{i,R}$ and the other $0.5 \cdot \log_2 |A_i|$ bits are mapped onto $s_{i,I}$, where $s_i = s_{i,R} + j \cdot s_{i,I}$. The real and imaginary mappings need not be the same. Embodiments of Max-Log detection apply to various bit-to-symbol mapping examples; for example, and not by way of limitation, embodiments apply to Gray coding (see for example, IEEE Std 802.11a-1999) and dual-carrier modulation (DCM) encoding (see for example, U.S. provisional patent application Ser. No. 60/912,487 for "Dual-Carrier Modulation (DCM) Encoder-Decoder for Higher Data Rate Modes of WiMedia PHY", hereby incorporated herein by reference).

Gray coding is defined such that the bit mapping of adjacent symbols differs in only one bit. In addition, it uses the same bit-to-symbol mapping for the real and imaginary parts of the symbol. It can be specified for an $2^{2n}$-QAM constellation by specifying the mapping for the underlying $2^n$-PAM constellation. For 4-PAM, the mapping may be $\{-3 \leftrightarrow 00, -1 \leftrightarrow 01, +1 \leftrightarrow 11, +3 \leftrightarrow 10\}$.

When DCM encoding is used, the two channel inputs have different bit mappings. Both channel inputs can be specified for a 16-point constellation by specifying the mapping for the underlying 4-PAM constellation. The mapping for the real part of the first input uses Gray coding {−3↔00, −1↔01, +1↔11, +3↔10}, but the mapping for the imaginary part of the first input is different {−3↔00, −1↔01, +1↔10, +3↔11}. For the second input, the mapping for the real and imaginary parts is the same {−3↔01, −1↔11, +1↔00, +3↔10}; for further discussion, please consider U.S. patent application Ser. No. 11/099,317 for "Versatile System for Dual Carrier Transformation in Orthogonal Frequency Division Multiplexing", and U.S. provisional patent application Ser. No. 60/912,487 for "Dual-Carrier Modulation (DCM) Encoder-Decoder for Higher Data Rate Modes of WiMedia PHY", hereby incorporated herein by reference.

In the following discussions, examples use QAM constellations that are not normalized, for example 4-QAM is used as $\{\pm 1 \pm \sqrt{-1}\}$. It should be understood, however that embodiments can also be applied to normalized constellations. For example, one common way to normalize the 4-QAM constellation is to divide each element by $\sqrt{2}$, i.e. $\{\pm 1/\sqrt{2} \pm \sqrt{-1}/\sqrt{2}\}$.

Initially, the cost of an arbitrary vector $\hat{S}$ can be written as:

$$C(\hat{S}) = (r - H\hat{S})^* W(r - H\hat{S}), \quad (7)$$

where $W = (E[ww^*])^{-1}$. Of particular interest is the case where W is a diagonal matrix. For a two-dimensional channel, the cost of $\hat{S}$ is explicitly written as:

$$C(\hat{s}_1, \hat{s}_2) = \left(\begin{bmatrix} r_1 \\ r_2 \end{bmatrix} - \begin{bmatrix} h_{1,1} & h_{1,2} \\ h_{2,1} & h_{2,2} \end{bmatrix}\begin{bmatrix} \hat{s}_1 \\ \hat{s}_2 \end{bmatrix}\right)^* \begin{bmatrix} w_{1,1} & 0 \\ 0 & w_{2,2} \end{bmatrix}\left(\begin{bmatrix} r_1 \\ r_2 \end{bmatrix} - \begin{bmatrix} h_{1,1} & h_{1,2} \\ h_{2,1} & h_{2,2} \end{bmatrix}\begin{bmatrix} \hat{s}_1 \\ \hat{s}_2 \end{bmatrix}\right). \quad (8)$$

The LLR value for the j-th bit of the i-th symbol is computed from the cost as follows:

$$\lambda_{i,j} = \begin{cases} \min_{\hat{s}_1 \in A_1(0,j), \hat{s}_2 \in A_2} C(\hat{s}_1, \hat{s}_2) - \min_{\hat{s}_1 \in A_1(1,j), \hat{s}_2 \in A_2} C(\hat{s}_1, \hat{s}_2) & \text{if } i=1 \\ \min_{\hat{s}_1 \in A_1, \hat{s}_2 \in A_2(0,j)} C(\hat{s}_1, \hat{s}_2) - \min_{\hat{s}_1 \in A_1, \hat{s}_2 \in A_2(1,j)} C(\hat{s}_1, \hat{s}_2) & \text{if } i=2 \end{cases} \quad (9)$$

Again, the modified Max-Log detector can be specially defined to reduce complexity:

$$\lambda_{i,j} = \begin{cases} \min_{\hat{s}_1 \in \tilde{A}_1(0,j), \hat{s}_2 \in A_2} C(\hat{s}_1, \hat{s}_2) - \min_{\hat{s}_1 \in \tilde{A}_1(1,j), \hat{s}_2 \in A_2} C(\hat{s}_1, \hat{s}_2) & \text{if } i=1 \\ \min_{\hat{s}_1 \in \tilde{A}_1, \hat{s}_2 \in A_2(0,j)} C(\hat{s}_1, \hat{s}_2) - \min_{\hat{s}_1 \in \tilde{A}_1, \hat{s}_2 \in A_2(1,j)} C(\hat{s}_1, \hat{s}_2) & \text{if } i=2. \end{cases}$$

The set $\tilde{A}_1$ here can be any subset of $A_1$ that is preferably chosen in a way to minimize performance loss of the modified Max-Log detector relative to the Max-Log detector.

It should be appreciated that computing the set of LLR values requires minimizing the cost function twice for each bit in each symbol. However, the set over which it is minimized is different in each case. Many symbol-to-bit mappings independently map bits onto the real and imaginary portions of the symbols. Such mappings can be exploited to simplify minimizing the cost function. Specifically, the simplified cost function can be written in the following form:

$$C(\hat{s}_1, \hat{s}_2) = \alpha(\hat{s}_1) + C_R(\hat{s}_1, \hat{s}_{2,R}) + C_I(\hat{s}_1, \hat{s}_{2,I}), \quad (10)$$

where $\hat{s}_i = \hat{s}_{i,R} + \sqrt{-1} \cdot \hat{s}_{i,I}$, and $\alpha(\hat{s}_1)$ is independent of $\hat{s}_2$. Different ways to compute $\alpha(\hat{s}_1)$, $C_R(\hat{s}_1, \hat{s}_{2,R})$, and $C_I(\hat{s}_1, \hat{s}_{2,I})$ will be described later. For convenience, these values will be referred to herein as the first layer cost $\alpha(\hat{s}_1)$, the second layer real cost $C_R(\hat{s}_1, \hat{s}_{2,R})$, and the second layer imaginary cost $C_I(\hat{s}_1, \hat{s}_{2,I})$. Equation (10) is preferably used to implement embodiments of Max-Log detection.

FIG. 1 illustrates a block diagram of an exemplary Max-Log detector, according to embodiments, for computing LLR values. Specifically, computation of the LLR values for each bit in the symbol will now be described. Assume that the first $0.5 \cdot \log_2|A_i|$ bits in $s_i = s_{i,R} + \sqrt{-1} \cdot s_{i,I}$ are mapped onto $s_{i,R}$, and the last $0.5 \cdot \log_2|A_i|$ bits in $s_i$ are mapped onto $s_{i,I}$ as would be the case in Gray coding. It should, of course, be appreciated that any mapping will work as long as the bits are independently mapped onto $s_{i,R}$ and $s_{i,I}$. This means that $C_R(\hat{s}_1, \hat{s}_{2,R})$ and $C_I(\hat{s}_1, \hat{s}_{2,I})$ as described in equation (10) can be independently minimized in order to compute the LLR values according to equation (9). Namely, for each possible value of $s_1$ the following $2 \cdot \log_2|A_2|$ minimums are computed (j=1 ... $\log_2|A_2|$):

$$J_R(\hat{s}_1, k, j) = \min_{\hat{s}_{2,R} \in A_{2,R}(k,j)} C_R(\hat{s}_1, \hat{s}_{2,R}), j \leq 0.5 \cdot \log_2|A_2| \quad (11)$$

$$J_I(\hat{s}_1, k, j) = \min_{\hat{s}_{2,I} \in A_{2,I}(k, j - 0.5 \cdot \log_2|A_2|)} C_I(\hat{s}_1, \hat{s}_{2,I}), \quad j > 0.5 \cdot \log_2|A_2|. \quad (12)$$

For convenience the two minimums $J_R(\hat{s}_1, k, j)$ and $J_I(\hat{s}_1, k, j)$ are referred to as the real and imaginary kernels, respectively, because they are important to the Max-Log detector computations. As the values of $s_1$ are enumerated, both $J_R(\hat{s}_1, k, j)$ and $J_I(\hat{s}_1, k, j)$ are computed so that the following minimums can also be computed:

The partial minimum of the imaginary part of the second symbol:

$$J_{MI}(\hat{s}_1) = \min_{k=0,1, j > 0.5 \cdot \log_2|A_2|} J_I(\hat{s}_1, k, j) \quad (13)$$

The partial minimum of the real part of the second symbol:

$$J_{MR}(\hat{s}_1) = \min_{k=0,1, j \leq 0.5 \cdot \log_2|A_2|} J_R(\hat{s}_1, k, j) \quad (14)$$

The local minimum for the first symbol:

$$J_M(\hat{s}_1) = J_{MR}(\hat{s}_1) + J_{MI}(\hat{s}_1) \quad (15)$$

The bit-level local minimums for the first symbol:

$$J_{RI}(\hat{s}_1, k, j) = \begin{cases} J_R(\hat{s}_1, k, j) + J_{MI}(\hat{s}_1) & \text{if } j \leq 0.5 \cdot \log_2|A_2| \\ J_{MR}(\hat{s}_1) + J_I(\hat{s}_1, k, j) & \text{if } j > 0.5 \cdot \log_2|A_2| \end{cases} \quad (16)$$

The LLR values in equation (9) (i=1,2, j=1 ... $\log_2|A_2|$) are then computed as:

$$\lambda_{i,j} = \begin{cases} \min_{\hat{s}_1 \in A_1(0,j)}(\alpha(\hat{s}_1) + J_M(\hat{s}_1)) - \\ \quad \min_{\hat{s}_1 \in A_1(1,j)}(\alpha(\hat{s}_1) + J_M(\hat{s}_1)) & \text{if } i=1 \\ \min_{\hat{s}_1 \in A_1}(\alpha(\hat{s}_1) + J_{RI}(\hat{s}_1, 0, j)) - \\ \quad \min_{\hat{s}_1 \in A_1}(\alpha(\hat{s}_1) + J_{RI}(\hat{s}_1, 1, j)) & \text{if } i=2 \end{cases} \quad (17)$$

In summary, the set of LLR values are computed according to equation (17) which may be implemented by computing $\alpha(\hat{s}_1)$, $J_{RI}(\hat{s}_1, k, j)$ and $J_M(\hat{s}_1)$ for each value of $\hat{s}_1$, i.e. $\hat{s}_1 \in A_1$ or $\hat{s}_1 \in \tilde{A}_1$ for a modified Max-Log detector, and keeping track of the minimum values for each j and k. Note that the roles of $s_1$ and $s_2$ could be reversed without changing the resulting LLR value; in other words $s_2$ could be enumerated instead of $s_1$. A first step towards computing $J_{RI}(\hat{s}_1,k,j)$ and $J_M(\hat{s}_1)$ is to compute the values $J_R(\hat{s}_1,k,j)$ and $J_I(\hat{s}_1,k,j)$ for each k and each j.

Embodiments enable computation of $J_R(\hat{s}_1,k,j)$ and $J_I(\hat{s}_1,k,j)$ to be performed in series, in parallel, or a mixture of the two as desired. A serial implementation may compute $J_R(\hat{s}_1,k,j)$ by computing $C_R(\hat{s}_1,\hat{s}_{2,R})$ for each value of $\hat{s}_1$ and comparing the most recent cost to the costs or smallest cost already computed. Alternatively, the elements in $A_1$ could be divided into groups, then the minimum $C_R(\hat{s}_1,\hat{s}_{2,R})$ from each group are computed, and then the minimum from the set of minimums is determined.

Figure 2:
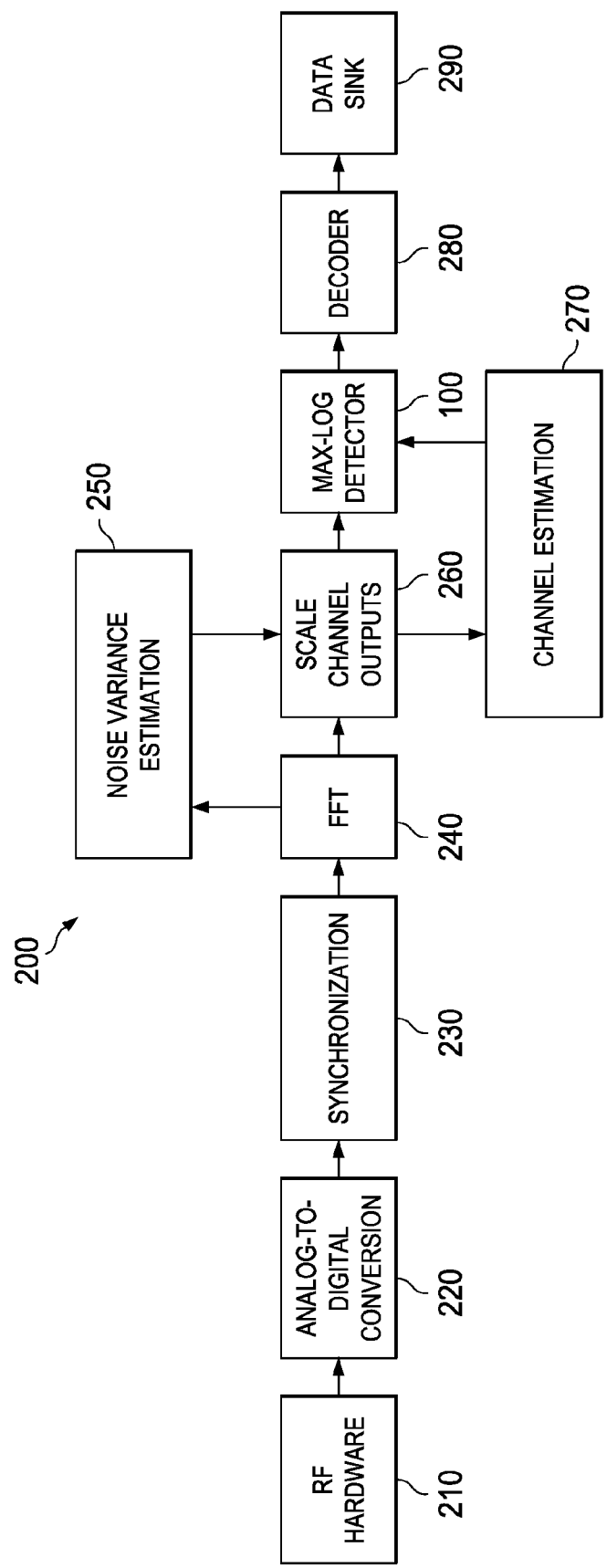
FIG. 2 illustrates a block diagram of an exemplary communication system comprising an exemplary Max-Log detector, according to embodiments.

FIG. 2 is a block diagram of an exemplary communication system 200 in which embodiments of MIMO Max-Log detector 100 may be used to advantage. Specifically, a wireless (e.g., radio frequency) stream of information is received at RF hardware 210, converted to a digital stream at analog-to-digital converter 220, and synchronized at 230. At this point the start of the packet has been located, and the digital stream is passed through a fast-Fourier transformation at FFT 240. The output of FFT 240 is provided to estimator 250 which estimates the noise variance of the stream. The outputs of FFT 240 and estimator 250 are provided to scaler 260 where the channel stream is preferably scaled using the noise variance estimation on the transformed stream, and separated into components. For an example, and not by way of limitation, of a scaler 260, reference is made to "Scaling to Reduce Wireless Signal Detection Complexity", U.S. patent application Ser. No. 11/928,050, filed Oct. 30, 2007, hereby incorporated in its entirety herein by reference. The outputs of scaler 260 are preferably fed to channel estimator 270 which estimates the H matrix. Scaler 260 forwards channel output, r, and channel estimator 270 forwards the estimated H matrix to MIMO detector 100. MIMO detector 100, which will be described as comprising a Max-Log or modified Max-Log detector for portions of this discussion, generates LLR values which are in turn provided to decoder 280 for analysis and/or further processing. The output of decoder 280 is stored in data sink 290 which can be any form of memory now known or later developed.

How to compute the LLR values representing cost will now be derived. Expansion of equation (8) yields:

$$C(\hat{s}_1, \hat{s}_2) = \left( \begin{bmatrix} r_1 - h_{1,1}\hat{s}_1 - h_{1,2}\hat{s}_2 \\ r_2 - h_{2,1}\hat{s}_1 - h_{2,2}\hat{s}_2 \end{bmatrix} \right) * \begin{bmatrix} w_{1,1} & 0 \\ 0 & w_{2,2} \end{bmatrix} \quad (18)$$

$$\left( \begin{bmatrix} r_1 - h_{1,1}\hat{s}_1 - h_{1,2}\hat{s}_2 \\ r_2 - h_{2,1}\hat{s}_1 - h_{2,2}\hat{s}_2 \end{bmatrix} \right)$$

$$= \left( \begin{bmatrix} r_1 - h_{1,1}\hat{s}_1 - h_{1,2}\hat{s}_2 \\ r_2 - h_{2,1}\hat{s}_1 - h_{2,2}\hat{s}_2 \end{bmatrix} \right) * \begin{bmatrix} w_{1,1} & 0 \\ 0 & w_{2,2} \end{bmatrix}$$

$$\left( \begin{bmatrix} r_1 h_{1,1}\hat{s}_1 - h_{1,2}\hat{s}_2 \\ r_2 - h_{2,1}\hat{s}_1 - h_{2,2}\hat{s}_2 \end{bmatrix} \right)$$

$$= w_{1,1}|r_1 - h_{1,1}\hat{s}_1 - h_{1,2}\hat{s}_2|^2 + w_{2,2}|r_2 - h_{2,1}\hat{s}_1 - h_{2,2}\hat{s}_2|^2.$$

For convenience, $y_i(\hat{s}_1) = r_i - h_{i,1}\hat{s}_1$ is substituted to achieve:

$$C(\hat{s}_1,\hat{s}_2) = w_{1,1}|y_1(\hat{s}_1) - h_{1,2}\hat{s}_2|^2 + w_{2,2}|y_2(\hat{s}_1) - h_{2,2}\hat{s}_2|^2. \quad (19)$$

The squared terms expand to obtain the following:

$$C(\hat{s}_1, \hat{s}_2) = w_{1,1}(|y_1(\hat{s}_1)|^2 - 2\text{Re}(y_1^*(\hat{s}_1)h_{1,2}\hat{s}_2) + |h_{1,2}\hat{s}_2|^2) + \quad (20)$$

$$w_{2,2}(|y_2(\hat{s}_1)|^2 - 2\text{Re}(y_2^*(\hat{s}_1)h_{2,2}\hat{s}_2) + |h_{2,2}\hat{s}_2|^2)$$

$$= (w_{1,1}|y_1(\hat{s}_1)|^2 + w_{2,2}|y_2(\hat{s}_1)|^2) -$$

$$\text{Re}(2\hat{s}_2(y_1^*(\hat{s}_1)h_{1,2}w_{1,1} + y_2^*(\hat{s}_1)h_{2,2}w_{2,2})) +$$

$$|\hat{s}_2|^2(|h_{1,2}|^2 + |h_{2,2}|^2)$$

$$= \rho(\hat{s}_1) - 2\text{Re}(\beta^*(\hat{s}_1) \cdot \hat{s}_2) + |\hat{s}_2|^2 \gamma$$

The following variables are introduced to make the notation more concise:

$$\beta^*(\hat{s}_1) = \beta_R(\hat{s}_1) - j \cdot \beta_I(\hat{s}_1) = y_1^*(\hat{s}_1)h_{1,2}w_{1,1} + y_2^*(\hat{s}_1)h_{2,2}w_{2,2}$$

$$\gamma = w_{1,1}|h_{1,2}|^2 + w_{2,2}|h_{2,2}|^2.$$

$$\rho(\hat{s}_1) = w_{1,1}|y_1(\hat{s}_1)|^2 + w_{2,2}|y_2(\hat{s}_1)|^2$$

These three variables—$\beta$, $\gamma$, and $\rho$—are fundamental to implementation of embodiments of Max-Log detection 100. For convenience, the variable $\beta$ may be referred to in the present discussion as the cross-product, the $\gamma$ referred to as the norm, and $\rho(\hat{s}_1)$ referred to as the local norm. Once these three variables are computed, then the minimizations of equations (11) and (12) may be found.

Some embodiments directly compute $J_R(\hat{s}_1,k,j)$ and $J_I(\hat{s}_1,k,j)$; other embodiments compute $J_R(\hat{s}_1,k,j)$ and $J_I(\hat{s}_1,k,j)$ by using a look-up table (LUT). It will be appreciated that each type of embodiment defines $\alpha(\hat{s}_1)$, $C_R(\hat{s}_1,\hat{s}_{2,R})$, and $C_I(\hat{s}_1,\hat{s}_{2,I})$ differently as explained below.

Consider first embodiments which directly compute $J_R(\hat{s}_1,k,j)$ and $J_I(\hat{s}_1,k,j)$. The three terms from the right-hand side of equation (10) can be rewritten in terms of the new variables from equation (21) as follows:

$$\alpha(\hat{s}_1) = \rho(\hat{s}_1), \quad (22)$$

$$C_R(\hat{s}_1,\hat{s}_{2,R}) = \hat{s}_{2,R}^2 \gamma - 2\beta_R(\hat{s}_1)\hat{s}_{2,R}, \quad (23)$$

$$C_I(\hat{s}_1,\hat{s}_{2,I}) = \hat{s}_{2,I}^2 \gamma - 2\beta_I(\hat{s}_1)\hat{s}_{2,I}. \quad (24)$$

There are multiple ways to implement embodiments based on direct computation. For example, and not by way of limitation, embodiments may implement what shall be referred to herein as brute-force direct computation (BF-DC), rule-based direct computation (R-DC), and/or slicer-based direct computation (S-DC). In embodiments implementing BF-DC, assuming that $\gamma$, $\beta_I(\hat{s}_1)$ and $\beta_R(\hat{s}_1)$ have already been computed, then $J_R(\hat{s}_1,k,j)$ and $J_I(\hat{s}_1,k,j)$ can be computed by minimizing $C_R(\hat{s}_1,\hat{s}_{2,R})$ and $C_I(\hat{s}_1,\hat{s}_{2,I})$ per equations (11) and (12). It is considered brute-force because embodiments implementing BF-DC compute all instances of the cost functions.

Alternatively, embodiments implementing R-DC for computing the minimizations $J_R(\hat{s}_1,k,j)$ and $J_1(\hat{s}_1,k,j)$ do so by computing only one value of $C_R(\hat{s}_1,\hat{s}_{2,R})$ or $C_1(\hat{s}_1,\hat{s}_{2,I})$. Deciding which value of $\hat{s}_{2,R}$ and $\hat{s}_{2,I}$ for which to compute $C_R(\hat{s}_1,\hat{s}_{2,R})$ and $C_1(\hat{s}_1,\hat{s}_{2,I})$, respectively, can be done by computing $\gamma$, $\beta_R(\hat{s}_1)$ and $\beta_I(\hat{s}_1)$ then applying the rules as specified in the following tables depending on the alphabet to which $s_2$ belongs. Each alphabet and each different symbol-to-bit mapping employs a different set of rules. The following tables are designed for a Gray-coded mapping, but the concept can be easily adapted to any symbol-to-bit mapping in view of the teachings of the present disclosure.

4-QAM. Although implementing the minimizations for 4-QAM is trivial because there is only one possibility for each bit taking on a certain value, it is included for the sake of understanding and thoroughness.

TABLE 1

Minimization rules for 4-QAM.

$$J_R(\hat{s}_1, 0, 1) = C_R(\hat{s}_1, -1)$$
$$J_R(\hat{s}_1, 1, 1) = C_R(\hat{s}_1, 1)$$
$$J_I(\hat{s}_1, 0, 2) = C_I(\hat{s}_1, -1)$$
$$J_I(\hat{s}_1, 1, 2) = C_I(\hat{s}_1, 1)$$

16-QAM. Assume that $A_2$ is the 16-QAM alphabet, and it has a Gray-coded bit-to-symbol mapping. This means that there are eight different required minimizations (two for each bit), and embodiments implementing BF-DC compute eight cost functions. The eight minimizations associated with the real part of the symbol are enumerated in Table 2. Note that the two most significant bits (MSB) map to $S_{2,R}$, while the two least significant bits map to $s_{2,I}$. The following is one example of minimization; the other embodiments can be similarly derived. Further, similar rules can be derived for other bit-to-symbol mappings.

Consider the case when the MSB is zero (j=1, k=0); this implies that $\hat{s}_{2,R}$ is either −1 or −3. Embodiments compute the minimum cost of these two possibilities, which is $J_R(\hat{s}_1,0,1)$ = $\min\{C_R(\hat{s}_1,-1), C_R(\hat{s}_1,-3)\}$ according to the above notation. Equations (23) and (24) derive $C_R(\hat{s}_1,-1)=2\beta_R(\hat{s}_1)+\gamma$ and $C_R(\hat{s}_1,-3)=6\beta_R(\hat{s}_1)+9\gamma$, respectively. Thus, equation (11) is equivalent to $J_R(\hat{s}_1,0,1)=\min\{2\beta_R(\hat{s}_1)+\gamma, 6\beta_R(\hat{s}_1)+9\gamma\}$. A simple rule tells which of these two is smaller; namely, if $\beta_R(\hat{s}_1)>=2\gamma$, then $C_R(\hat{s}_1,-1)<C_R(\hat{s}_1,-3)$. The minimization is then computed according to:

$$J_R(\hat{s}_1, 0, 1) = \begin{cases} C_R(\hat{s}_1, -1) & \text{if } \beta_R(\hat{s}_1) > -2\gamma \\ C_R(\hat{s}_1, -3) & \text{else} \end{cases} \quad (25)$$

Using this rule, the minimum of $C_R(\hat{s}_1,-1)$ and $C_R(\hat{s}_1,-3)$ can be computed without explicitly computing both values. The rules for the other bits are given in Table 2. In the tables, only the rules for the bits mapped onto the real part of the symbol are given. However, due to the Gray coding structure the rules for the bits mapped onto the imaginary part are obtained by replacing $\beta_R(\hat{s}_1)$ with $-\beta_I(\hat{s}_1)$ in the rules table.

TABLE 2

Minimization rules for Gray-coded 16-QAM.

$$J_R(\hat{s}_1, 0, 1) = \begin{cases} C_R(\hat{s}_1, -1) & \text{if } \beta_R(\hat{s}_1) > -2\gamma \\ C_R(\hat{s}_1, -3) & \text{else} \end{cases}$$

$$J_R(\hat{s}_1, 1, 1) = \begin{cases} C_R(\hat{s}_1, 1) & \text{if } \beta_R(\hat{s}_1) < 2\gamma \\ C_R(\hat{s}_1, 3) & \text{else} \end{cases}$$

$$J_R(\hat{s}_1, 0, 2) = \begin{cases} C_R(\hat{s}_1, -3) & \text{if } \beta_R(\hat{s}_1) < 0 \\ C_R(\hat{s}_1, 3) & \text{else} \end{cases}$$

$$J_R(\hat{s}_1, 1, 2) = \begin{cases} C_R(\hat{s}_1, -1) & \text{if } \beta_R(\hat{s}_1) < 0 \\ C_R(\hat{s}_1, 1) & \text{else} \end{cases}$$

64-QAM. Assume that $A_2$ is the 64-QAM alphabet, and it has a Gray-coded bit-to-symbol mapping. This means that there are 12 different required minimizations (two for each bit). The R-DC implementation rules for the six minimizations associated with the real part of the symbol are shown in Table 3; it should be readily appreciated that rules for the minimizations associated with the imaginary part are similar. It should be noted that the rules set forth in Table 3 are based on the assumption that the three most significant bits (MSB) map to $S_{2,R}$, while the three least significant bits map to $s_{2,I}$. Embodiments which implement BF-DC compute 16 cost functions (8 values for the real symbols and 8 values for the imaginary symbols), then the minimum of the 16 costs (or cost functions) is determined for each value of each bit. Embodiments which implement R-DC are less complex than embodiments which implement BF-DC in the 64-QAM case, because by following the rules at most 12 cost functions are computed and more importantly which of the cost functions is smallest (the minimum) for each value of each bit directly follows from the rules.

TABLE 3

Minimization rules for Gray coded 64-QAM.

$$J_R(\hat{s}_1, 0, 1) = \begin{cases} C_R(\hat{s}_1, -7) & \text{if } \beta_R(\hat{s}_1) < -6\gamma \\ C_R(\hat{s}_1, -5) & \text{if } -4\gamma > \beta_R(\hat{s}_1) \geq -6\gamma \\ C_R(\hat{s}_1, -3) & \text{if } -2\gamma > \beta_R(\hat{s}_1) \geq -4\gamma \\ C_R(\hat{s}_1, -1) & \text{else} \quad \beta_R(\hat{s}_1) \geq -2\gamma \end{cases}$$

$$J_R(\hat{s}_1, 1, 1) = \begin{cases} C_R(\hat{s}_1, 7) & \text{if } \beta_R(\hat{s}_1) > 6\gamma \\ C_R(\hat{s}_1, 5) & \text{if } 4\gamma < \beta_R(\hat{s}_1) \leq 6\gamma \\ C_R(\hat{s}_1, 3) & \text{if } 2\gamma < \beta_R(\hat{s}_1) \leq 4\gamma \\ C_R(\hat{s}_1, 1) & \text{else} \quad \beta_R(\hat{s}_1) \leq 2\gamma \end{cases}$$

$$J_R(\hat{s}_1, 0, 2) = \begin{cases} C_R(\hat{s}_1, -7) & \text{if } \beta_R(\hat{s}_1) < -6\gamma \\ C_R(\hat{s}_1, -5) & \text{if } 0 > \beta_R(\hat{s}_1) \geq -6\gamma \\ C_R(\hat{s}_1, 5) & \text{if } 6\gamma > \beta_R(\hat{s}_1) \geq 0 \\ C_R(\hat{s}_1, 7) & \text{else} \quad \beta_R(\hat{s}_1) \geq 6\gamma \end{cases}$$

$$J_R(\hat{s}_1, 1, 2) = \begin{cases} C_R(\hat{s}_1, -3) & \text{if } \beta_R(\hat{s}_1) < -2\gamma \\ C_R(\hat{s}_1, -1) & \text{if } 0 > \beta_R(\hat{s}_1) \geq -2\gamma \\ C_R(\hat{s}_1, 1) & \text{if } 2\gamma > \beta_R(\hat{s}_1) \geq 0 \\ C_R(\hat{s}_1, 3) & \text{else} \quad \beta_R(\hat{s}_1) \geq 2\gamma \end{cases}$$

$$J_R(\hat{s}_1, 0, 3) = \begin{cases} C_R(\hat{s}_1, -7) & \text{if } \beta_R(\hat{s}_1) < -4\gamma \\ C_R(\hat{s}_1, -1) & \text{if } 0 > \beta_R(\hat{s}_1) \geq -4\gamma \\ C_R(\hat{s}_1, 1) & \text{if } 4\gamma > \beta_R(\hat{s}_1) \geq 0 \\ C_R(\hat{s}_1, 7) & \text{else} \quad \beta_R(\hat{s}_1) \geq 4\gamma \end{cases}$$

$$J_R(\hat{s}_1, 1, 3) = \begin{cases} C_R(\hat{s}_1, -5) & \text{if } \beta_R(\hat{s}_1) < -4\gamma \\ C_R(\hat{s}_1, -3) & \text{if } 0 > \beta_R(\hat{s}_1) \geq -4\gamma \\ C_R(\hat{s}_1, 3) & \text{if } 4\gamma > \beta_R(\hat{s}_1) \geq 0 \\ C_R(\hat{s}_1, 5) & \text{else} \quad \beta_R(\hat{s}_1) \geq 4\gamma \end{cases}$$

The third type of embodiments for directly computing $J_R(\hat{s}_1,k,j)$ is S-DC which computes the symbol $\hat{s}_{2,R}$ that minimizes $C_R(\hat{s}_1,\hat{s}_{2,R})$ using a slicer. Similarly, $J_I(\hat{s}_1,k,j)$ is directly computed by computing the symbol $\hat{s}_{2,I}$ that minimizes $C_I(\hat{s}_1,\hat{s}_{2,I})$ using a slicer. A slicer is defined as follows:

$$\text{slicer}(x,A) = \arg\min_{\hat{s} \in A} |\hat{s}-x|^2. \quad (26)$$

It can be seen that equation (11) can be computed applying the slicer as follows:

$$J_R(\hat{s}_1, k, j) = C_R\left(\hat{s}_1, \text{slicer}\left(\frac{\beta_R(\hat{s}_1)}{\gamma}, A_{2,R}\right)\right). \quad (27)$$

Similarly, equation (12) can be computed as follows:

$$J_I(\hat{s}_1, k, j) = C_I\left(\hat{s}_1, \text{slicer}\left(\frac{\beta_I(\hat{s}_1)}{\gamma}, A_{2,I}\right)\right). \quad (28)$$

Note that the rules in Tables 1, 2, and 3 yield the same results as equations (27) and (28), and may therefore be considered special cases of embodiments implementing S-DC that reduce complexity by avoiding computing $\beta_R(\hat{s}_1)/\gamma$ and $\beta_I(\hat{s}_1)/\gamma$. It should be appreciated that embodiments employing a slicer such as defined here will also work for any other alphabet not shown in the tables.

Consider now embodiments which employ a look-up table (LUT) to compute $J_R(\hat{s}_1,k,j)$ and $J_I(\hat{s}_1,k,j)$. An alternative form of equation (20) rearranges the terms so that the cost can be computed using a set of look-up tables. The square is completed to arrive at an equivalent form of the cost equation:

$$C(\hat{s}_1, \hat{s}_2) = \rho(\hat{s}_1) - \frac{|\beta(\hat{s}_1)|^2}{\gamma} + \gamma\left|\hat{s}_2 - \frac{\beta(\hat{s}_1)}{\gamma}\right|^2. \quad (29)$$

Next, dependencies on the real and imaginary components of $\hat{s}_2$ are separated:

$$C(\hat{s}_1, \hat{s}_2) = \rho(\hat{s}_1) - \frac{|\beta(\hat{s}_1)|^2}{\gamma} + \gamma\left|\hat{s}_{2,R} - \frac{\beta_R(\hat{s}_1)}{\gamma}\right|^2 + \gamma\left|\hat{s}_{2,I} - \frac{\beta_I(\hat{s}_1)}{\gamma}\right|^2. \quad (30)$$

The three terms in equation (10) can be rewritten in terms of the new variables as follows:

$$\alpha(\hat{s}_1) = \rho(\hat{s}_1) - \frac{|\beta(\hat{s}_1)|^2}{\gamma}, \quad (31)$$

$$C_R(\hat{s}_1, \hat{s}_{2,R}) = \gamma\left|\hat{s}_{2,R} - \frac{\beta_R(\hat{s}_1)}{\gamma}\right|^2, \quad (32)$$

$$C_I(\hat{s}_1, \hat{s}_{2,I}) = \gamma\left|\hat{s}_{2,I} - \frac{\beta_I(\hat{s}_1)}{\gamma}\right|^2. \quad (33)$$

Now equations (11) and (12) can be computed using one-dimensional look-up tables because of the form of equations (32) and (33). Embodiments of the LUT are preferably defined as follows:

$$\text{LUT}_R(x,k,j) = \min_{\hat{s} \in A_{2,R}(k,j)} |\hat{s} - x|^2 \quad (34)$$

$$\text{LUT}_I(x,k,j) = \min_{\hat{s} \in A_{2,I}(k,j)} |\hat{s} - x|^2 \quad (35)$$

These look-up table (LUT) definitions apply to any bit-mapping where the real and imaginary parts of a symbol are independently mapped to bit values. As mentioned earlier, two such examples are Gray coding, and DCM encoding. Gray coding has the additional benefit that $A_{2,R} = A_{2,I}$ so that the look-up tables are the same $\text{LUT}_R(x,k,j) = \text{LUT}_I(x,k,j)$ Equations (11) and (12) are computed as:

$$J_R(\hat{s}_1, k, j) = \gamma \cdot \text{LUT}_R\left(\frac{\beta_R(\hat{s}_1)}{\gamma}, k, j\right), j \le 0.5 \cdot \log_2|A_2|, \quad (36)$$

$$J_I(\hat{s}_1, k, j) = \gamma \cdot \text{LUT}_I\left(\frac{\beta_I(\hat{s}_1)}{\gamma}, k, j\right), j < 0.5 \cdot \log_2|A_2|. \quad (37)$$

By employing look-up tables, the minimum costs have been found while effectively computing only one instance of the cost functions $C_R(\hat{s}_1,\hat{s}_{2,R})$ or $C_I(\hat{s}_1,\hat{s}_{2,I})$. It should be appreciated that these look-up tables can be viewed as an alternative—or specialized—set of pre-defined rules to the ones provided herein with respect to R-DC. The two techniques (using a look-up table and using a predefined set of rules) both use sets of pre-defined rules for computing the minimum cost function, although such sets of rules are clearly very different.

Finally, the LLR values are computed according to equation (17). The reduced size of the look-up tables makes such embodiments low complexity. The size of these look-up tables is reduced because the input can be restricted to the range around the possible values of $s_{2,R}$ and $s_{2,I}$.

Note that the factor $\gamma$ (the norm) is common to all the terms in the minimizations; the Max-Log detector can therefore extract a factor, such as factor $\gamma$, from the kernel computation to reduce complexity further and then compensate for the extracted factor during the LLR computation by returning the factor when computing the LLR, in which case the equations for computing the kernels and the LLR values are modified as follows:

$$J_R(\hat{s}_1, k, j) = \text{LUT}_R\left(\frac{\beta_R(\hat{s}_1)}{\gamma}, k, j\right), j \le 0.5 \cdot \log_2|A_2|, \quad (38)$$

$$J_I(\hat{s}_1, k, j) = \text{LUT}_I\left(\frac{\beta_I(\hat{s}_1)}{\gamma}, k, j\right), j > 0.5 \cdot \log_2|A_2|. \quad (39)$$

$$\lambda_{i,j} = \begin{cases} \gamma \cdot \left(\min_{\hat{s}_1 \in A_1(0,j)}\left(\frac{\alpha(\hat{s}_1)}{\gamma} + J_M(\hat{s}_1)\right) - \min_{\hat{s}_1 \in A_1(1,j)}\left(\frac{\alpha(\hat{s}_1)}{\gamma} + J_M(\hat{s}_1)\right)\right) & \text{if } i = 1 \\ \gamma \cdot \left(\min_{\hat{s}_1 \in A_1}\left(\frac{\alpha(\hat{s}_1)}{\gamma} + J_{RI}(\hat{s}_1, 0, j)\right) - \min_{\hat{s}_1 \in A_1}\left(\frac{\alpha(\hat{s}_1)}{\gamma} + J_{RI}(\hat{s}_1, 1, j)\right)\right) & \text{if } i = 2. \end{cases} \quad (40)$$

Embodiments of a Max-Log detector 100 implemented as disclosed above can be adjusted to fit a variety of special cases of the channel model, some illustrative examples of which follow. In all embodiments, it is preferred that the effective channel model has N inputs and N outputs, where N is an integer. Before MIMO processing begins the signal is modeled as:

$$\tilde{r} = \tilde{H}\tilde{s} + \tilde{w}, \quad (41)$$

where $\tilde{H}$ is an M×N matrix, $\tilde{s} = [\tilde{s}_1\ \tilde{s}_2\ \ldots\ \tilde{s}_N]^T$ is an N dimensional vector of symbols that may be drawn from different alphabets, and $\tilde{w}$ is additive white noise with $$E[\tilde{w}\tilde{w}^*] = \begin{bmatrix} \sigma_1 & 0 \\ 0 & \sigma_2 \end{bmatrix}.$$

For cases where the autocorrelation of the true additive noise has non-zero off-diagonal components, $$E[\tilde{w}\tilde{w}^*] = \begin{bmatrix} \sigma_{1,1} & \sigma_{1,2} \\ \sigma_{2,1} & \sigma_{2,2} \end{bmatrix},$$

the channel can be made to fit the above channel model by first scaling the channel outputs. For example, and not by way of limitation, a scaling matrix F can be chosen and applied to the channel output so that the new effective channel output is described as $\tilde{r}=F\tilde{H}\hat{s}+F\tilde{w}$, such that $$E[F\tilde{w}\tilde{w}^*F^*] = \begin{bmatrix} \sigma_1 & 0 \\ 0 & \sigma_2 \end{bmatrix};$$

see for example, and not by way of limitation, U.S. patent application Ser. No. 12/022,927 for "Systems and Methods for Scaling to Equalize Noise Variance". It should be appreciated that in this discussion it is assumed that such processing, if necessary, has already been done so that the channel model fits equation (41) and $$E[\tilde{w}\tilde{w}^*] = \begin{bmatrix} \sigma_1 & 0 \\ 0 & \sigma_2 \end{bmatrix}.$$

Some special examples of converting this M×N channel into an N×N channel are given below.

H is complex. If M=N, obviously no conversion is necessary to obtain a square channel matrix. At least some of Max-Log detector 100 embodiments were derived assuming that the channel matrix is square and contains only complex coefficients. When H is complex:

$$H=\tilde{H} \quad (42)$$

$$r=\tilde{r} \quad (43)$$

H is triangular with real diagonals. The channel matrix is triangular (either lower or upper) when a decomposition, such as a QR decomposition, is used to transform the channel. The QR decomposition is defined as:

$$\tilde{H}=QR, \quad (44)$$

where Q is an M×N matrix with orthonormal columns, and R is an N×N triangular matrix with real diagonal elements. This results in:

$$r=Q^*\tilde{r} \quad (45)$$

$$H=R \quad (46)$$

In this special case, the direct computation method can be reduced to use the look-up tables from equations (34) and (35) by using the following definitions:

$$\alpha(\hat{s}_1) = w_{1,1}|y_1(\hat{s}_1)|^2 \quad (47)$$

$$C_R(\hat{s}_1, \hat{s}_{2,R}) = w_{2,2}h_{2,2}^2 \left| \hat{s}_{2,R} - \frac{y_{2,R}(\hat{s}_1)}{h_{2,2}} \right|^2, \quad (48)$$

$$C_I(\hat{s}_1, \hat{s}_{2,I}) = w_{2,2}h_{2,2}^2 \left| \hat{s}_{2,I} - \frac{y_{2,I}(\hat{s}_1)}{h_{2,2}} \right|^2. \quad (49)$$

Equations (47)-(49) demonstrate that a fully enumerated 2×2 CLIC detector [such as disclosed in U.S. patent application Ser. No. 11/930,259 for "Candidate List Generation and Interference Cancellation Framework for MIMO Detection," is a special implementation of Max-Log detector embodiments.

H is triangular and monic. The channel matrix can be triangular and monic (meaning the channel matrix has ones along the diagonal) by filtering $\tilde{r}$ using both Q and R from the QR decomposition. Let $r_{i,j}$ denote the element at the i-th row and j-th column of R. Then the effective channel model is obtained as follows:

$$r = \begin{bmatrix} r_{1,1} & 0 \\ 0 & r_{2,2} \end{bmatrix}^{-1} Q^*\tilde{r}, \quad (50)$$

$$H = \begin{bmatrix} r_{1,1} & 0 \\ 0 & r_{2,2} \end{bmatrix}^{-1} R = \begin{bmatrix} 1 & 0 \\ r_{2,1}/r_{2,2} & 1 \end{bmatrix} \text{ or } \begin{bmatrix} 1 & r_{1,2}/r_{1,1} \\ 0 & 1 \end{bmatrix}, \quad (51)$$

H is real. When the channel is real, complexity diminishes significantly at least because the channel matrix has half as many coefficients. Besides a physical channel that is real, there are other scenarios where the channel would be real. For example, in an ultra-wideband (UWB) system, data may be transmitted in a redundant fashion by using two different sub-carriers to simultaneously transmit a function of the same two data symbols; see for example and not by way of limitation, U.S. provisional patent application Ser. No. 60/912,487 for "Dual-Carrier Modulation (DCM) Encoder-Decoder for Higher Data Rate Modes of WiMedia PHY". In such an embodiment, the MIMO channel may be written as:

$$\tilde{r}=GTs+\tilde{w}, \quad (52)$$

where $$G = \begin{bmatrix} g_1 & 0 \\ 0 & g_2 \end{bmatrix}$$

is a 2×2 matrix with complex diagonal elements, and Ts is the vector of transmitted symbols. The 2×2 matrix T mixes the two symbols $s_1$ and $s_2$ so that pieces of both are transmitted on the two sub-carriers. An example T matrix is $$T = \frac{1}{\sqrt{17}} \begin{bmatrix} 4 & 1 \\ 1 & -4 \end{bmatrix}.$$

The MIMO channel matrix can be taken as H=GT, but that approach forms a complex channel. Alternatively, the signal can be equalized using $G^*$:

$$r = G^*\tilde{r} \quad (53)$$

$$= G^*GTs + G^*\tilde{w},$$

With such an equalization, the effective MIMO channel matrix is real when the matrix T is real, meaning:

$$H = G^*GT = \begin{bmatrix} |g_1|^2 & 0 \\ 0 & |g_2|^2 \end{bmatrix} T \quad (54)$$

H has real diagonals. The MIMO channel may alternatively have some real coefficients and some complex coefficients.

This would happen, for example and not by way of limitation, if M=N and the receiver uses an equalizer that is the conjugate of the diagonals of the channel matrix. In such an embodiment:

$$r = \begin{bmatrix} \tilde{h}_{1,1}^* & 0 \\ 0 & \tilde{h}_{2,2}^* \end{bmatrix} \tilde{r}, \qquad (55)$$

$$H = \begin{bmatrix} |\tilde{h}_{1,1}|^2 & \tilde{h}_{1,1}^* \tilde{h}_{1,2} \\ \tilde{h}_{2,2}^* \tilde{h}_{2,1} & |\tilde{h}_{2,2}|^2 \end{bmatrix}, \qquad (56)$$

Another example of this case is when the channel is complex and M>N, then a simple conversion can be used:

$$r = \tilde{H}^H \tilde{r}, \qquad (57)$$

$$H = \tilde{H}^H H, \qquad (58)$$

where $\tilde{H}^H$ is the conjugate transpose of $\tilde{H}$. So although the effective channel processed by the Max-Log detector is N×N, it should be appreciated that the underlying MIMO channel need not have the same number of inputs as outputs.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for multiple-input, multiple-output (MIMO) communication, comprising:
   computing, using a Max-Log detector, a set of log-likelihood ratio (LLR) values for a channel input by minimizing a cost function while computing only one instance of the cost function for each value of each bit in a symbol.

2. The method of claim 1, wherein the minimizing further comprises minimizing the cost function by computing real and imaginary kernels according to a predefined set of rules.

3. The method of claim 1, wherein the computing further comprises minimizing a cost function by using a slicer to find a symbol that minimizes a cost of at least one of: a real portion of the channel input and an imaginary portion of the channel input.

4. The method of claim 1, wherein the computing further comprises computing the LLR values using an effective channel model for the channel input that has N inputs and N outputs, where N is an integer.

5. The method of claim 1, further comprising mapping real and imaginary parts of the channel input to different bits.

6. The method of claim 5, wherein the mapping further comprises using one from the group of: Gray coding and dual-carrier modulation (DCM).

7. The method of claim 1, wherein the computing further comprises computing $\beta$, $\rho$, and $\beta$ before minimizing a cost function.

8. The method of claim 1, wherein the computing further comprises computing $\alpha$, $J_{RI}$, and $J_M$ for each of at least one value of the symbol and tracks minimum values for each bit, where a is a first-layer norm, $J_{RI}$ is a local minimum for the symbol, and $J_M$ is a bit-level local minimum for the symbol.

9. A method for multiple-input, multiple-output (MIMO) communication, comprising:
   computing, using a Max-Log detector, a set of log-likelihood ratio (LLR) values for a channel input by computing all instances of a cost function for each value of each bit in a symbol and selecting the minimum cost from all computed instances of the cost function for each value of each bit.

* * * * *